May 20, 1952     J. DE W. GRAY     2,597,472
PROCESS AND APPARATUS FOR MAINTAINING THE
VISCOSITY OF INK THROUGH CIRCULATION
Filed Feb. 15, 1946     2 SHEETS—SHEET 2
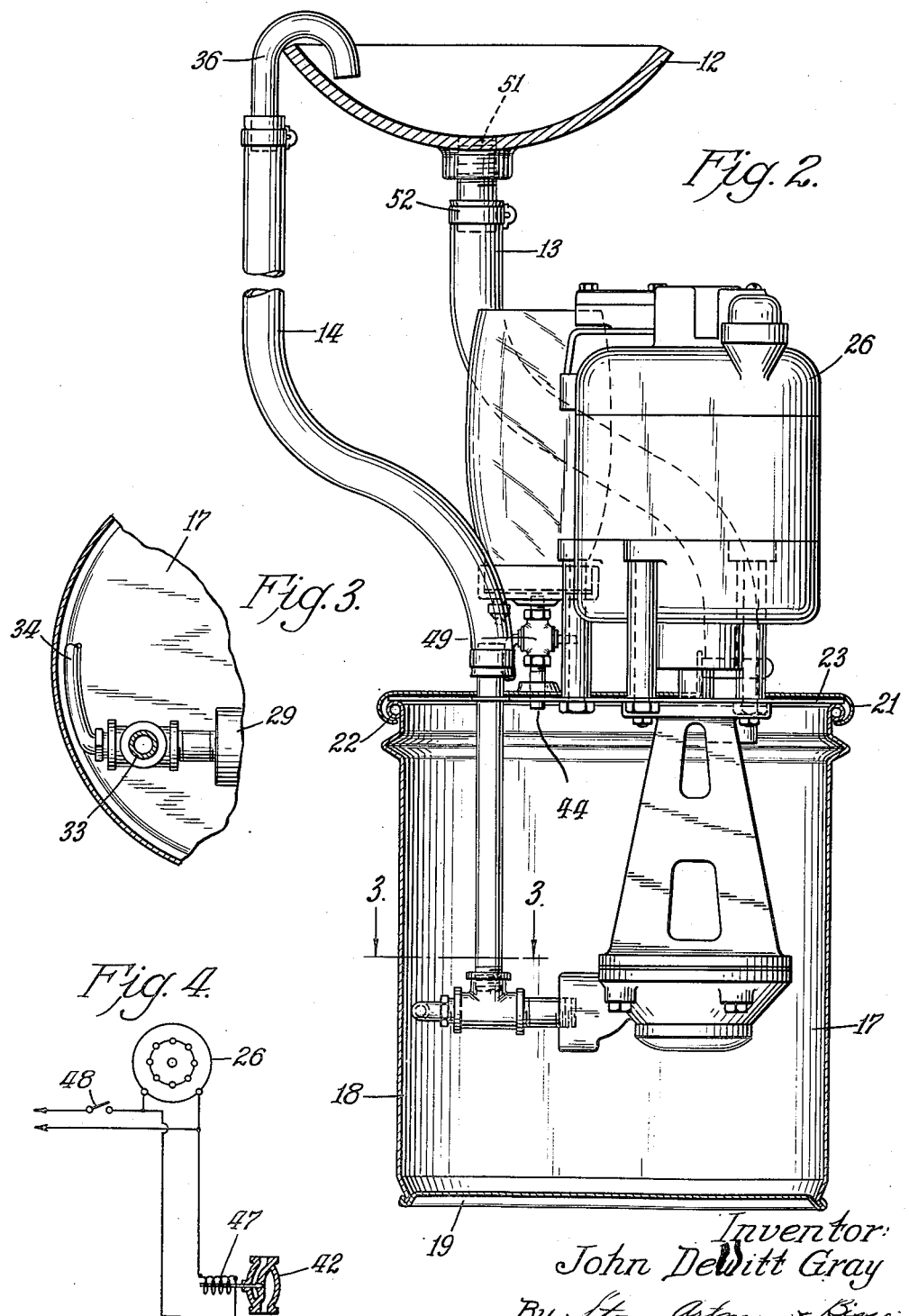
Inventor:
John DeWitt Gray
By Stone, Artman & Bisson
Attys.

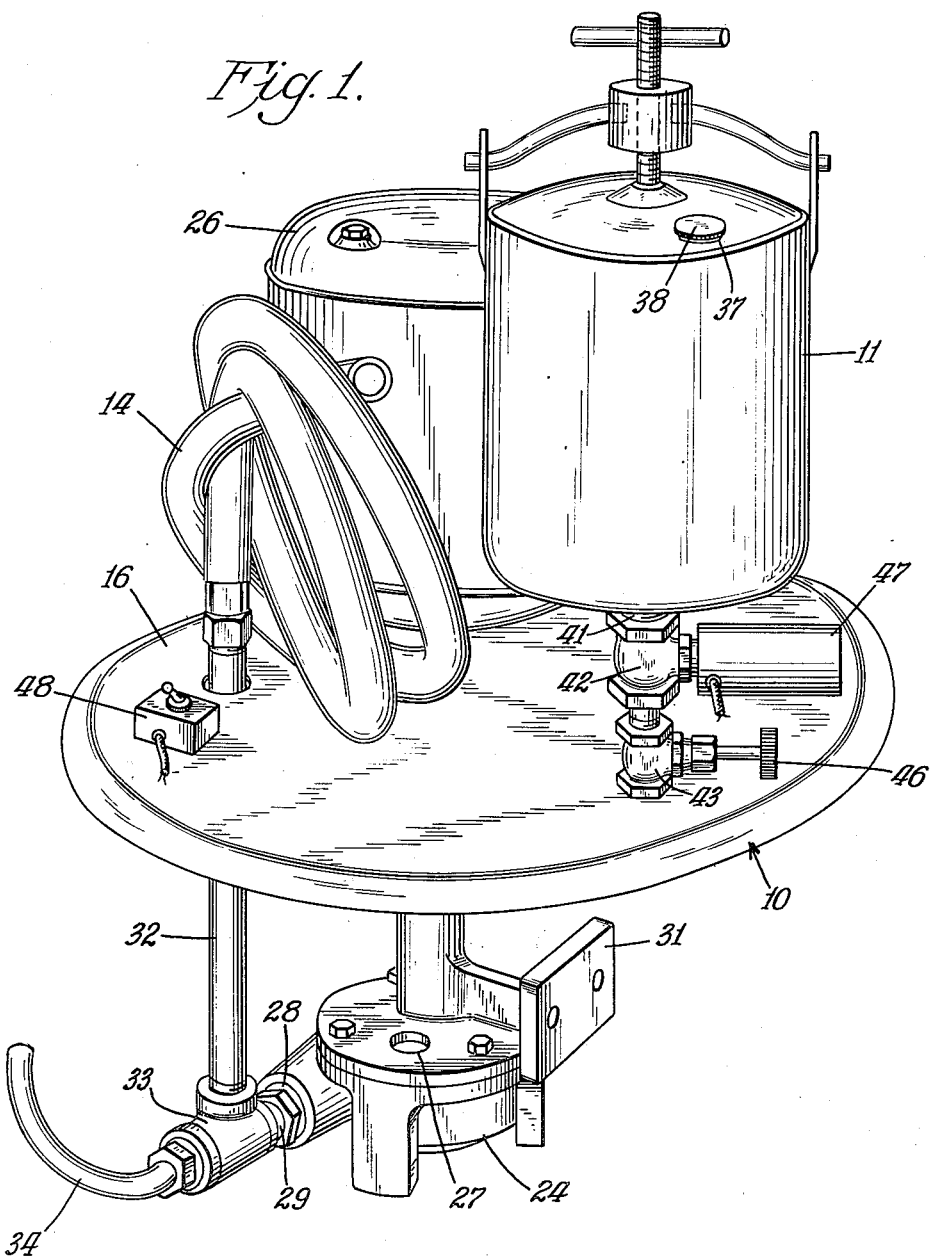

Patented May 20, 1952

2,597,472

UNITED STATES PATENT OFFICE 2,597,472

PROCESS AND APPARATUS FOR MAINTAINING THE VISCOSITY OF INK THROUGH CIRCULATION

John De Witt Gray, Evanston, Ill., assignor, by mesne assignments, to Gray-Mills Corporation, Evanston, Ill., a corporation of Illinois Application February 15, 1946, Serial No. 647,746

6 Claims. (Cl. 259—95)

1

This invention relates to an agitator pumping system which has been particularly designed for circulating rotogravure and aniline base inks, although it is useful for pumping other solutions which require agitation in order to maintain a selected consistency. The invention constitutes an adaptation of a pump disclosed in the Rothaker and Gray application, Serial No. 436,082, filed March 25, 1942, for Coolant Pumping Apparatus, now abandoned.

In the printing industry, it has been the practice for press operators to constantly stir the aniline base ink contained in the press ink reservoirs from which the ink is fed directly to the press rolls. In the aniline base inks, there is a tendency for the solids to drop out of suspension and settle when the ink is not in motion or being agitated. In the conventional press ink reservoir, the solids contained in the ink tend to collect on the bottom and occasionally adhere to the side walls of the reservoir as the liquid level of the ink is lowered during operation of the press. Moreover, the solvent is quite volatile and, in certain types of runs, it is necessary to add solvent to the ink so as to maintain proper viscosity. The addition of the solvent to the ink while in the ink reservoir is undesirable because of the possibility of having an unevenly mixed ink fed to the press rolls. Also, the amount of solvent that is to be added cannot be accurately determined when the mixing is being done in the ink reservoir.

It has been discovered that the suspension of the pigment and other solids in the ink can be maintained and additional solvent introduced into the ink solution conveniently and efficiently through an improved and modified form of a coolant pumping unit, such as heretofore has been used in circulating a cooling solution to a steel tool or machine. This is done by the insertion of the intake end of the coolant pumping unit into one end of the press ink reservoir, circulating the ink through the pumping unit while maintaining the proper viscosity of the ink solution by the addition of solvent, and then discharging the treated ink solution into the opposite end of the reservoir. The adaptation of the coolant pumping unit for this purpose involves the use of a pump that is properly designed to accommodate the ink solution, to move the ink solution without increased evaporation of the solvent and without permitting a settling-out or precipitation of the solids either in the pump or in the reservoir, and to supply the additional solvent in a correct amount. Also, it is desirable that the pumping unit give constant and efficient service without involved maintenance and servicing for the length of time for which the press is operated.

While the feature of circulation of the ink solution by means of a pump is included in the process and apparatus embodying the invention, the desirable advantages provided in this invention result from the combination of the features of circulation of the ink solution through the reservoir and automatic maintenance of the proper viscosity of the ink by the addition of solvent during the circulation. This is accomplished by the use of a reservoir having a circulating pump connected therewith, and by the use of a solvent container and means for feeding the solvent to the ink solution as the latter is being circulated.

It is an object of the invention to provide an improved process and apparatus for maintaining the ink solution for a printing press in a proper state of suspension and viscosity for application to the press rollers.

It is a further object of the invention to provide a process and apparatus which circulates a press ink solution through a reservoir and pump so that solid particles contained in the ink solution are maintained in suspension and in which a measured amount of solvent is constantly introduced to the ink solution so that the proper viscosity of the ink solution is maintained at all times.

It is a more specific object of the invention to provide an apparatus including an ink reservoir from which ink is supplied to press rollers, a pump which is adapted to circulate ink through the reservoir, and means for constantly adding a solvent to the ink solution that is being circulated so as to maintain the proper viscosity of the ink solution.

It is a further specific object of the invention to provide in combination with a circulating system for an ink solution used in a printing press, means for constantly adding a solvent to the ink solution.

It is also an object of the invention to provide means associated with a pump container in an ink circulating system for agitating and maintaining the ink solution in a proper state of suspension in the container.

Further objects and advantages will be apparent from the following description and drawings appended thereto.

In the drawings, in which like reference characters refer to like parts:

Fig. 1 is a perspective view of a pump assembly utilized in the process and apparatus embodying the invention;

Fig. 2 is a side elevational view in section showing a modified form of the pump utilized in the invention connected with an ink reservoir for a printing press;

Fig. 3 is a fragmentary plan view illustrating means for agitating ink solution while in the pump container; and, Fig. 4 is a diagrammatic view illustrating the wiring diagram for the electrically operated pump and valve for the solvent tank utilized in the invention.

As illustrated in the drawings, the circulating system embodying the invention comprises pump assembly 10 including container 17 and solvent tank 11. Ink reservoir 12, which is adapted for use with a printing press, is connected to the pump assembly 10 by means of tubes 13 and 14. In general, the ink solution is supplied to the press rolls from reservoir 12. When the press is in operation, the supply of ink is maintained in the reservoir by the ink solution being pumped from container 17 through tube 14 and into the reservoir and back into container 17. Solvent for maintaining the desired viscosity of the ink solution is added from the solvent tank 11 to the ink supply in the container.

The pump assembly 10 is supported on plate 16 which is adapted to fit over and form the lid of container 17. Container 17 includes side walls 18 and bottom 19, and contains a reserve supply of ink solution that is fed to the ink reservoir 12. To effect a secure engagement of plate 16 to container 17, rim 21 is formed around the periphery of the plate, and is snapped over bead 22 on the upper edge of the container. Additional support for the pump assembly is provided by supporting member 23, which is a round, plate-like member, secured to the inside of plate 16.

As shown in Fig. 1, pump 24 is of the gear type and is supported below plate 16 and inside of container 17. The pump 24 is driven by electric motor 26 which may be secured by any conventional means to plate 16. Inlet 27 is provided in pump 24 for the introduction of the ink solution into the pump so that it may be discharged through outlet 28 and into outlet pipe 29. Pump 24 may be supported on plate 16 by means of pump bracket 31.

Outlet pipe 29 is formed wih at least two openings therein so that the ink solution discharged from the pump through outlet 28 may be separated into a double stream, one passing through reservoir pipe 32 and the other passing through valve 33 and into agitator tube 34. The ink solution passing through reservoir pipe 32 is forced into reservoir tube 14 and eventually passes through reservoir nozzle 36 and into reservoir 12. (See Fig. 2.)

The ink solution that is passed through valve 33 and agitator tube 34 flows back into container 17 where it is again fed into inlet 27 and through pump 24. As shown in Fig. 3, agitator tube 34 is positioned within the container 17 so as to provide a swirling movement to the ink solution within the container. After the circulating system has been operated for an appreciable period of time, this swirling movement becomes general through the container so that the ink contained therein is constantly moving. Such movement of the ink prevents the settling of solid particles of ink solution in the bottom of the container and also insures that solvent added to the ink solution in the container 17 is thoroughly mixed before the ink solution is fed into reservoir 12. Adjustment of valve 33 enables the amount of ink introduced into the reservoir to be controlled, thereby maintaining the desired level of ink solution within the reservoir at all times.

Solvent for the press ink solution is supplied to the container from solvent tank 11. The tank is supported on plate 16 and includes opening 37 in its upper portion, with cap 38 secured thereon, through which the solvent is introduced into the tank 11. The solvent is fed into the ink solution maintained in container 17 by means of tank outlet 41. The solvent passing through shut-off valve 42, drip valve 43, and drip pipe 44. Upon passing from the drip pipe 44, the solvent drops into the ink solution in container 17 and is throoughly mixed therein by the rotary movement of the ink. The rate of flow of the solvent from the tank 11 into the container is controlled by adjusting drip valve 43. The drip valve is manually operated, and is opened or closed by turning knob 46. Shut-off valve 42 is operated by energizing solenoid 47 which causes the valve 42 to open.

In the embodiment of the invention illustrated in Fig. 2, the shut-off valve 42 and drip valve 43 are eliminated by the utilization of manually operated valve 49. Valve 49 may be opened to permit the flow of the solvent at the desired rate from the tank 11 to container 17. Upon shutting down the circulating system, valve 49 is manually closed to shut off the flow of solvent into the container.

The circulating system is placed in operation by means of switch 48. Actuation of the switch energizes motor 26 and starts pump 24. In the embodiment illustrated in Fig. 1, operation of switch 48, in addition to energizing motor 26, energizes solenoid 47 so that valve 42 is opened thereby permitting the solvent to be fed into container 17. The dual function of switch 48 in energizing both the motor 26 and solenoid 47 is more clearly illustrated in Fig. 4. This arrangement insures that the flow of solvent from the tank 11 is automatically shut off when motor 26 is de-energized and the circulating system shut down.

The withdrawal of the ink solution from reservoir 12 is provided by reservoir outlet 51. The ink solution flowing through outlet 51 passes into tube 13 which is secured to the outlet by means of clamp 52. The tube 13 directs the ink solution into container 17 where it is diluted by means of the solvent from tank 11 so that it may be pumped again into reservoir 12. The constant flow of the ink solution through the reservoir insures that solid particles contained in the ink remain in suspension and do not settle to the bottom of the reservoir. Any tendency of such solid particles to settle is provided for by the withdrawal of the ink from the bottom of the reservoir so that such solid particles are carried into the container and into contact with the added solvent.

The circulation system also provides an ink supply in the ink reservoir 12 that is of the proper viscosity for application to the press roll. The constant addition of the solvent to the ink supply in the container compensates for the loss of solvent by evaporation, volatilization, or the like. The feature of agitation of the ink supply in the container by the utilization of tube 34 insures that the added solid is thoroughly mixed with the ink solution before the ink is fed to the reservoir.

The invention has thus provided an efficient and inexpensive means for maintaining a press ink solution in condition for application to the press rollers during the entire time that the press is in operation. The suspension of the solids contained in the ink is maintained by continuous agitation of the ink solution, while the viscosity of the solution is adjusted constantly and accurately before the ink is returned to the reservoir.

The above detailed description is given for purposes of illustration and the invention is to be limited only by the scope of the appended claims.

I claim:

1. A system for circulating an ink solution containing a volatile solvent through an ink reservoir open to the air which comprises a container for ink solution, a pump associated with the container for circulating the ink solution, a pump actuating means, means for flowing the solution continuously between the reservoir and the container, and a solvent tank having an outlet leading into the container with a valve thereon for continuously introducing a solvent for the ink solution into the container.

2. A circulating system for an ink solution containing a volatile solvent which comprises in combination an ink reservoir open to the air for use with a printing press, a pump assembly including an ink container, means for circulating ink solution continuously between the reservoir and the container, and a solvent tank having an outlet leading into the container with a valve thereon for continuously introducing a solvent for the ink solution into the container.

3. A circulating system for an ink solution containing a volatile solvent which comprises in combination an ink reservoir open to the air for use with a printing press, a pump assembly including an ink container, a pump positioned within the ink container, pump actuating means, means connected to the pump for circulating the ink solution continuously between the reservoir and the container, and a solvent tank having an outlet leading into the container with a valve thereon for continuously introducing a solvent for the ink solution into the container.

4. A circulating system for an ink solution containing a volatile solvent which comprises in combination an ink reservoir open to the air for use with a printing press, a pump assembly including an ink container, means for circulating the ink solution continuously between the reservoir and the container, a solvent tank having an outlet leading into the container with a valve thereon for introducing continuously a solvent for the ink solution into the container, and hydraulic means connected to the pump assembly for agitating the ink solution present in the container.

5. A circulating system for an ink solution containing a volatile solvent which comprises in combination a printing press ink reservoir open to the air, an ink container, a pump for circulating the ink solution, an electric motor for actuating the pump, liquid-type tubing between the reservoir and the pump in the container, a solvent tank having an outlet leading into the container with a valve thereon for continuously introducing an ink solvent into the container, and hydraulic agitating means associated with the outlet of the pump for returning a portion of the pumped ink solution into the container so as to cause a swirling movement of the ink solution present in the container.

6. A process for maintaining a selected viscosity of volatile rotogravure or aniline base inks in an open printing press reservoir which comprises the steps of continuously withdrawing the ink from the reservoir, of agitating the withdrawn ink, of adding solvent to the withdrawn ink at a rate comparable to the rate of evaporation of the solvent from the open reservoir, and of continuously returning the solvent-fortified ink to the reservoir.

JOHN DE WITT GRAY.

REFERENCES CITED

The following references are of record in the file of this patent:

UNITED STATES PATENTS

| Number    | Name    | Date          |
|-----------|---------|---------------|
| 1,706,418 | Sissom  | Mar. 26, 1929 |
| 1,873,596 | Jones   | Aug. 23, 1932 |
| 1,947,851 | Jewett  | Feb. 20, 1934 |
| 2,270,847 | Hyman   | Jan. 27, 1942 |

FOREIGN PATENTS

| Number  | Country  | Date         |
|---------|----------|--------------|
| 660,492 | Germany  | May 25, 1938 |